(Model.)
G. MEADER.
HAY LOADER.
No. 261,746. Patented July 25, 1882.
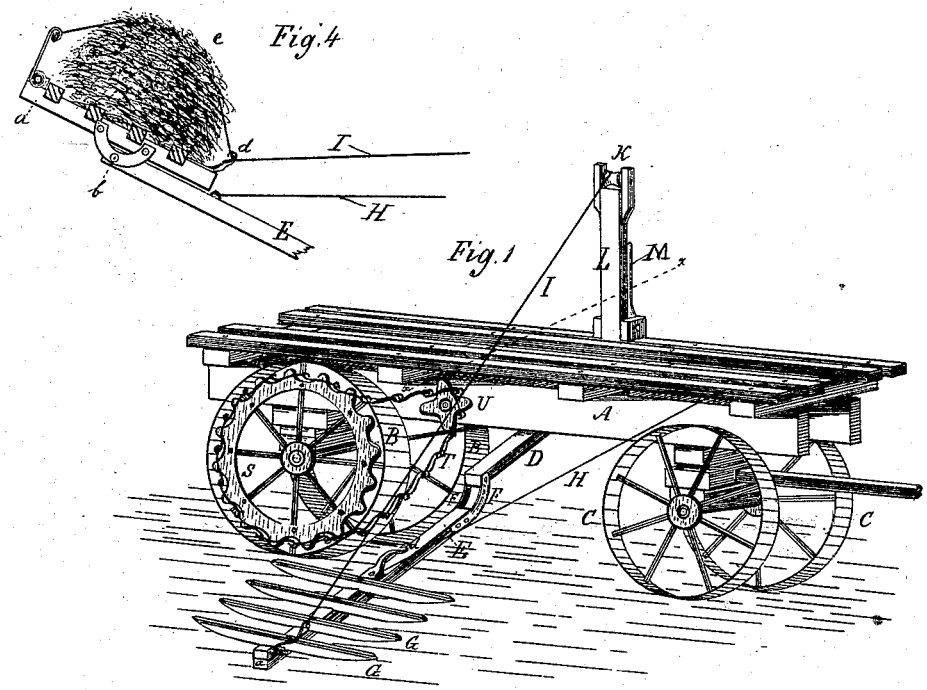
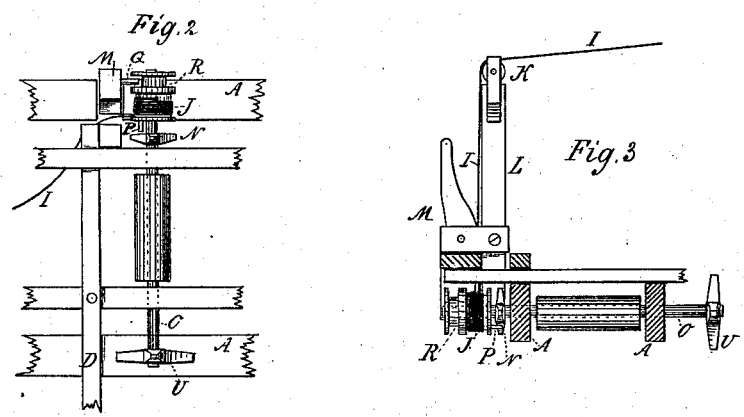
WITNESSES
Wm. A. Lowe
C. Sedgwick
INVENTOR
G. Meader
By Munn & Co.
Attorneys

UNITED STATES PATENT OFFICE.

GEORGE MEADER, OF FOWLER, INDIANA.

HAY-LOADER.

SPECIFICATION forming part of Letters Patent No. 261,746, dated July 25, 1882.

Application filed April 25, 1882. (Model.)

*To all whom it may concern:*

Be it known that I, GEORGE MEADER, of Fowler, in the county of Benton and State of Indiana, have invented a new and Improved Hay-Loader, of which the following is a full, clear, and exact description.

This invention consists of a rake projecting from the side of a wagon, to which it is pivoted so as to run along the ground with the wagon, and being connected at the outer end by a cord from a standard rising up from the opposite side of the wagon, said cord passing down from said standard over a drum to be put in gear by a clutch with a shaft turned by the wagon-wheels, so that when the rake has gathered its load it will be pulled up by said drum and cord on its pivot, so as to swing its load upon the wagon. The drum is then disengaged and the rake falls back to take another load, its descent being regulated by a brake, all as hereinafter described and claimed.

Reference is to be had to the accompanying drawings, forming a part of this specification, in which similar letters of reference indicate corresponding parts in all the figures.

Figure 1 is a perspective view of a hay-wagon with my improved hay-loader attached. Fig. 2 is a plan of the drum and clutch device inverted. Fig. 3 is a transverse section on line *x x* of Fig. 1, and Fig. 4 is a perspective view of the rake with its load being raised up to the wagon.

A represents the bed-frame of a hay-rake, mounted on the wheels B and C of a wagon in any approved way.

D is a string-beam attached to the under side of said bed-frame in any approved way so as to project a short distance from under said frame between the fore and hind wheels of one side of the wagon, suitably for carrying the end of the rake-beam E, as shown, said rake-beam being pivoted to it by the curved bars F, allowing the said beam to range about level with the ground to allow the teeth G, carried by said beam E outside of the wheels of the wagon, to be drawn under a bunch of hay, the said rake being stayed from the front of the wagon by a diagonal cord, H.

I represents the cord connecting the outer end of the rake with the hoisting-drum J, said cord passing over a guide-pulley, K, in the top of a standard, L, rising up from the opposite side of the wagon and down to said drum along a brake-lever and clutch-shifting lever M. The clutch consists of the notched disk or wheel N on the shaft O, and a pin, P, in the end of the drum, said drum being arranged to shift along the shaft, and, being worked by the pin Q in the lever M, working in the groove R of the drum.

When the lever M is shifted in the direction to disconnect the clutch to allow the rake to descend it binds the cord I against the standard L, and thus forms a brake to regulate the descent of the rake.

The shaft O is geared with a chain-wheel, S, on one of the wagon-wheels B by chain T and chain-pinion U.

The rake-teeth G are attached to a head, *a*, that is pivoted to the outer end of beam E at *b*, and said head has a hook, *d*, at the opposite end, in which the cord I is engaged when the rake has gathered its bunch of hay *e* to bind it on while being carried up to the wagon by the rake. The cord I is hooked onto hook *d* by an attendant walking along the ground to gather up any loose hay and place it on the rake. The clutch-lever is worked either by an attendant on the ground or on the load, as may be preferred.

It will be seen that when the drum is clutched with the shaft O the rake will be quickly swung up to deliver its load upon the wagon as the wagon moves along, and when disconnected will as quickly descend.

If the hay has been previously gathered in bunches, as it generally is, the bunches may be gathered up successively; but if it lies in windrows some will be gathered up and some left for the next time. The rake may also be employed for gathering the spread hay by passing twice over the ground.

When the load has become so high that the loader will not dump any more on it the rake is drawn up and held by the side of the load by stopping the wagon with the clutch in gear. The hay is then taken up from the rake by the attendant on the load until the load is finished. The rake is then fastened up against the side by the cord I and the brake-lever or other device while the load is carried away; or said loader may be detached by disconnecting it from the beam D and disconnecting the rope.

Having thus described my invention, I claim as new and desire to secure by Letters Patent—

1. The combination of cord I, rake G E, and hook d, substantially as specified.

2. The combination, with the clutch-drum J, rake G E, and cord I, of a lever, M, arranged to shift the clutch and act as a brake upon the cord, substantially as described.

GEORGE MEADER.

Witnesses:
GEO. H. STEWART,
JAMES WHANRY.